United States Patent [19]

Hirokane et al.

[11] Patent Number: 5,347,510
[45] Date of Patent: Sep. 13, 1994

[54] METHOD OF MANUFACTURING A MASTER PLATE WHERE ITS GUIDE GROOVE HAS AN INCLINED ANGLE

[75] Inventors: Junji Hirokane; Hiroyuki Katayama, both of Nara; Junichiro Nakayama; Michinobu Mieda, both of Shiki; Kenji Ohta, Kitakatsuragi, all of Japan

[73] Assignee: Sharp Kabushiki Kaisha, Osaka, Japan

[21] Appl. No.: 4,266

[22] Filed: Jan. 14, 1993

[30] Foreign Application Priority Data

Jan. 21, 1992 [JP] Japan .................................. 4-008501

[51] Int. Cl.$^5$ .............................................. G11B 7/26
[52] U.S. Cl. ........................ 369/275.5; 369/275.4; 369/277; 430/270; 430/323; 430/496
[58] Field of Search ............... 430/945, 495, 270, 323, 430/496; 369/275.5, 275.4, 278, 277

[56] References Cited

U.S. PATENT DOCUMENTS

| | | | |
|---|---|---|---|
| 4,673,602 | 6/1987 | Nakayama et al. | 369/288 |
| 4,767,693 | 8/1988 | Oba et al. | 430/270 |
| 4,954,065 | 9/1990 | Shindo et al. | 369/282 S |
| 4,980,262 | 12/1990 | Thomas et al. | 430/495 |
| 5,147,763 | 9/1992 | Kamitakahara | 430/323 |
| 5,230,770 | 7/1993 | Kashiwagi | 369/277 |

FOREIGN PATENT DOCUMENTS

| | | |
|---|---|---|
| 126594 | 11/1984 | European Pat. Off. . |
| 168763 | 1/1986 | European Pat. Off. . |
| 61-160850 | 7/1986 | Japan . |
| 62-66445 | 3/1987 | Japan . |
| 62-75952 | 4/1987 | Japan . |
| 63-281239 | 11/1988 | Japan . |
| 1279437 | 9/1989 | Japan . |
| 88/09990 | 12/1988 | World Int. Prop. O. . |

*Primary Examiner*—Paul M. Dzierzynski
*Assistant Examiner*—Kim-Kwok Chu

[57] ABSTRACT

A master plate for manufacturing a stamper for injecting molding of an optical memory device has a substrate having a plurality of guiding grooves on a surface thereof with a predetermined interval. The respective edge portions of the guiding grooves are inclined with respect to the surface of the substrate at an angle not more than 30°. According to a manufacturing method of the master plate, the post-baking process is carried out at a baking temperature of not less than 150° C. and an etching gas containing O$_2$ gas of 4 (SCCM) to 10 (SCCM) is used. Thus, even when the copying is carried out with respect to the substrate of the optical memory device according to the injection molding process wherein the stamper, which is manufactured based on the above-mentioned master plate, is used, the mold release of the stamper can be carried out without being caught by the substrate. Thus, it is possible to keep the respective shapes of the guiding grooves of the s tamper, thereby enabling of manufacturing the substrate of the optical memory device with high repeatability.

15 Claims, 8 Drawing Sheets

FIG. 7 (a) PRIOR ART
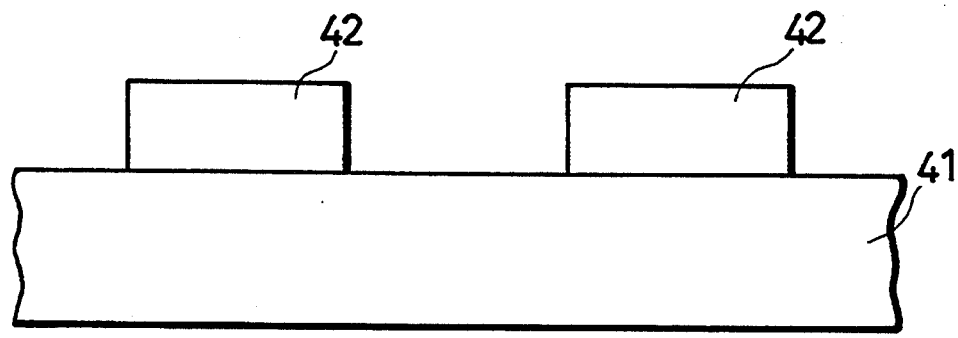
FIG. 7 (b) PRIOR ART
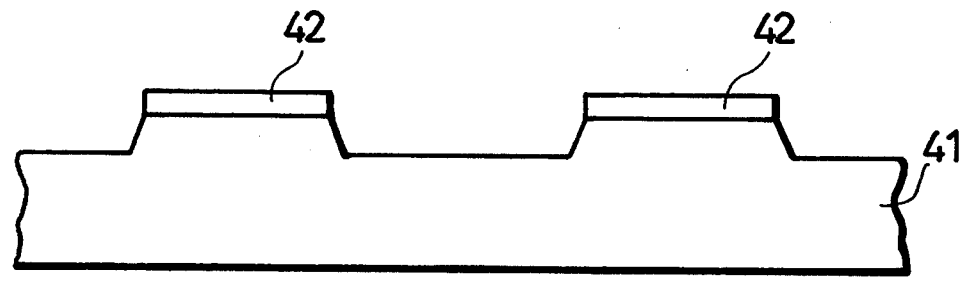
FIG. 7 (c) PRIOR ART
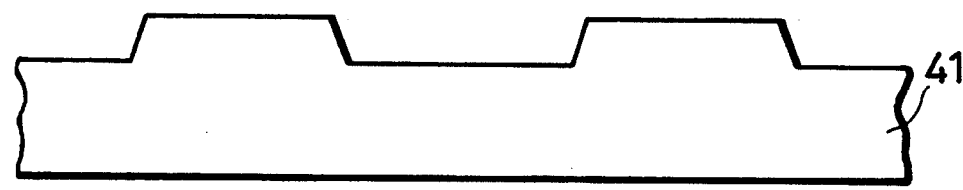

METHOD OF MANUFACTURING A MASTER PLATE WHERE ITS GUIDE GROOVE HAS AN INCLINED ANGLE

FIELD OF THE INVENTION

The present invention relates to a master plate of an optical memory device for manufacturing the optical memory device to or from which recording and reproducing of information are optically carried out and also relates to a manufacturing method of the master plate of the optical memory device.

BACKGROUND OF THE INVENTION

An optical memory device has been focussed on since it is a memory device having high density and large capacity. The reason why the optical memory device has the high density and large capacity is that a bit, which is a recording unit for information, is restricted only to a light beam diameter and thus the light beam can be set to have a shape of about 1 micron.

However, this gives many restrictions to the optical memory device. More specifically, the light beam should be positioned on the optical memory device in a high accuracy in order to record information on a predetermined recording area and in order to reproduce recorded information from a predetermined recording area. In general, optical memory device, which is exclusively used for reproducing of information, can be arranged such that address information is in advance contained in a recorded bit. Therefore, it is possible to position the light beam with the reproducing of recorded information. But, it is impossible to carry out recording of information on a write once-type memory or a rewritable memory so as to contain the address information therein during the recording of information.

Accordingly, in the write once-type memory or rewritable memory, it is employed that some guiding signal and guiding address are in advance contained in a memory substrate of the write once-type memory or rewritable memory. For example, the following is a general procedure: the memory substrate of the write once-type memory or rewritable memory are provided with grooves of physical protrusions and recessions; and recording and reproducing of information are carried out along the grooves. The grooves of the physical protrusions and recessions are discrete in a circumference direction of the respective memories, thereby presenting pit information indicative of each groove's address.

When the substrate of the optical memory device is made of the polycarbonate, the injection molding process, wherein a stamper having a pattern such as guiding grooves is used, is widely employed. The following deals with a conventional method for manufacturing the stamper with reference to FIG. 3.

First, a master plate 11 having a pattern such as guiding grooves is prepared (see FIG. 3(a)). The master plate 11 is coated with an electrode member 14 such as Ni, the electrode member 14 being a thin film having a thickness the range between 20 nm and 100 nm (see FIG. 3(b)). A Ni electrocasted thin film 15, having a thickness of the range between 200 μm and 400 μm is formed on the electrode member 14 (see FIG. 3(c)) by the electrocasting. Then, the Ni electrocasted thin film 15 is removed from the master plate 11. Thereafter, the other side of the Ni electrocasted thin film 15 is polished (see FIG. 3(d)), thereby finishing the manufacturing of the s tamper. mentioned above, the pattern such as the guiding grooves of the master plate 11 is exactly copied to the stamper so as to reversely form a pattern such as the guiding grooves on the stamper. A good master plate 11 should be manufactured in order to obtain a good stamper.

The following two methods for manufacturing the master plate 11 have been widely known: (1) a method for forming a protrusion and recession pattern 52 on a glass substrate 51 by the use of the photo resist (see FIG. 4(a)); and (2) a method for directly forming grooves of a protrusion and recession pattern on a glass substrate 51 according to the following steps, i.e., (a) making a mask by forming a pattern by the photo resist on the glass substrate 51, (b) carrying out the dry etching to the glass substrate 51 and thereafter (c) removing the photo resist (see FIG. 4 (b)).

When the master plate manufactured according to the method of FIG. 4(a) is observed by the STM (Scanning Tunnel Microscope), it is confirmed that there exist a plurality of minute physical protrusions and recessions on the surface of the protrusion and recession pattern 52 of the photo resist. In contrast, when the master plate manufactured according to the method of FIG. 4 (b) is observed by the STM, it is confirmed that smooth pattern such as the guiding grooves is formed by removing the photo resist on which there exist the residual minute physical protrusions and recessions after the dry etching. Accordingly, the master plate made by the etching is more preferable than that by the photo resist in order to decrease the noise.

The following conventional methods (1) to (3) are well known as the method for directly forming the guiding grooves and the like on the glass substrate. The following deals with the conventional methods (1) to (3) with reference to FIGS. 5 through 7.

According to the conventional method (1), guiding groove patterns 22 are formed on a glass substrate 21 by the photo resist (see FIG. 5(a)). After the photo resist, the dry etching is carried out by the use of a gas such as $CF_4$, $CHF_3$ (see FIG. 5(b)). After the dry etching, the residual photo resist is removed (see FIG. 5(c)), thereby directly forming physical protrusions and recessions on the glass substrate 21.

According to the conventional method (2), guiding groove patterns 32 are formed on a glass substrate 31 by the photo resist (see FIG. 6(a)). The guiding groove patterns 32 are baked at the temperature of more than the softening point of the photo resist (see FIG. 6(b)). Thereafter, the dry etching is carried out by the use of a gas such as $CF_4$, $CHF_3$ (see FIG. 6(c)). After the dry etching, the residual photo resist is removed (see FIG. 6(d)), thereby directly forming physical protrusions and recessions on the glass substrate 31.

According to the conventional method (3), guiding groove patterns 42 are formed on a glass substrate 41 by the photoresist (see FIG. 7(a)). The dry etching is carried out with respect to the guiding groove patterns 42 by the use of a gas such as $CF_4$, $CHF_3$ with $O_2$ gas (see FIG. 7(b)). After the dry etching, the residual photo resist is removed (see FIG. 7(c)), thereby directly forming physical protrusions and recessions on the glass substrate 41.

In order to copy the shape of the guiding grooves of the stamper to the polycarbonate substrate according to the injection molding process, it is required that the mold release of the polycarbonate substrate from the stamper is carried out while each shape of the guiding grooves of the stamper is kept unchanged, the polycarbonate substrate being formed by carrying out the injection molding with respect to the stamper.

However, according to the conventional method (1), each edge portion of the guiding grooves rises upward substantially perpendicularly. Therefore, the polycarbonate substrate is likely to be caught by the edge portion of the guiding groove when the mold release of the polycarbonate substrate from the stamper out, is carried thereby making it impossible for the polycarbonate substrate to keep the shape of the guiding groove unchanged.

The object of the conventional methods (2) and (3) is to improve the reliability, endurability and other functions of the optical disk memory substrate by keeping the respective continuity of a recording medium, a protecting layer, and other materials which are formed on the guiding grooves. Therefore, it can be achieved by the conventional methods (2) and (3) that each edge portion of the s tamper inclines so as to keep the continuity of the formed thin film. However, the conventional methods (2) and (3) do not ensure that each edge portion of the stamper greatly inclines so as to avoid being caught by the polycarbonate substrate during the mold release of the polycarbonate substrate from the stamper.

Bore specifically, as shown in FIG. 8, it is assumed that the injection molding is carried out by the use of the stamper which is obtained by the etched master plate according to the conventional methods (1) to (3), the stamper being composed of the electrode member 14 and the Ni electrocasted thin film 15. When the mold release of a polycarbonate substrate 16 from the stamper is carried out in a direction of the arrow of FIG. 8, each edge portion of the guiding grooves is caught by the polycarbonate substrate 16. Accordingly, the guiding groove pattern on the polycarbonate substrate 16 is deformed (see the reference numerals 16a and 16b of FIG. 8), thereby arising problem, i.e., the deformed grooves are not appropriate for leading a light beam which is converged onto the substrate.

SUMMARY OF THE INVENTION

It is an object of the present invention to provide a master plate of an optical memory device that can form a stamper by which a substrate of the optical memory device is obtained with repeatability.

In order to achieve the foregoing object, a master plate of an optical memory device in accordance with the present invention is characterized by comprising:

a substrate member having a plurality of guiding grooves on a surface thereof, the guiding grooves being spaced at a predetermined interval, each guiding groove having edge portions;

wherein the edge portions are inclined with respect to the surface of the substrate member, and inclined angles of said edge portions with respect to the surface of the substrate member are not more than 30°.

With the arrangement, the master plate of the optical memory device is arranged such that the respective edge portions of the guiding grooves are inclined with respect to the surface of the substrate member and inclined angles of the edge portions with respect to the surface of the substrate are not more than 30°. Accordingly, even when the copying is carried out with respect to the substrate of the optical memory device according to the injection molding process wherein the stamper, which is manufactured based on the above-mentioned master plate, is used, the mold release of the stamper can be carried out without being caught by the substrate. Thus, it is possible to keep the respective shapes of the guiding grooves of the s tamper, thereby enabling of manufacturing the substrate of the optical memory device with high repeatability.

It is another object of the present invention to provide a manufacturing method suitable for a master plate of the optical memory device like above.

In order to achieve the foregoing object, the manufacturing method of the master plate used for manufacturing a stamper for injection molding of the optical memory device in accordance with the present invention is characterized by comprising the steps of:

(a) coating a substrate member with a photo resist thin film;

(b) exposing guiding groove patterns of the master plate of the optical memory device by projecting light onto the photo resist thin film;

(c) developing the resist thin film having the exposed guiding groove patterns;

(d) post-baking the developed resist thin film at a temperature which causes the resist thin film to be deformed;

(e) carrying out dry etching after the post-baking by use of a mixed gas including a first etching gas for the substrate and a second etching gas for tile resist thin film;

(f) removing the resist thin film after the dry etching process.

According to the manufacturing method, by baking the resist thin film at tile temperature of more than the deforming temperature of the photo resist during the post-baking process, side portions of the resist thin film are inclined with respect to the surface of the substrate member. Further, by simultaneously carrying out etching of the resist thin film having the above-mentioned shape in the forming process of the guiding grooves on the substrate during the etching process, the master plate of the optical memory device can be manufactured wherein the guiding grooves are formed such that each edge portion is greatly inclined with respect to the substrate member at an angle of not more than 30°. Accordingly, even when the copying is carried out with respect to the substrate of the optical memory device according to the injection molding process wherein the stamper, which is manufactured based on the above-mentioned master plate, is used, the mold release of the stamper can be carried out without being caught by the substrate. Thus, it is possible to keep the respective shapes of guiding grooves of the stamper, thereby enabling of manufacturing the substrate of the optical memory device with high repeatability.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention:

FIG. 7a, b, c is an explanatory diagram showing a still another example of the conventional manufacturing methods of the optical memory device.

DESCRIPTION OF THE EMBODIMENTS

Figure 1A:
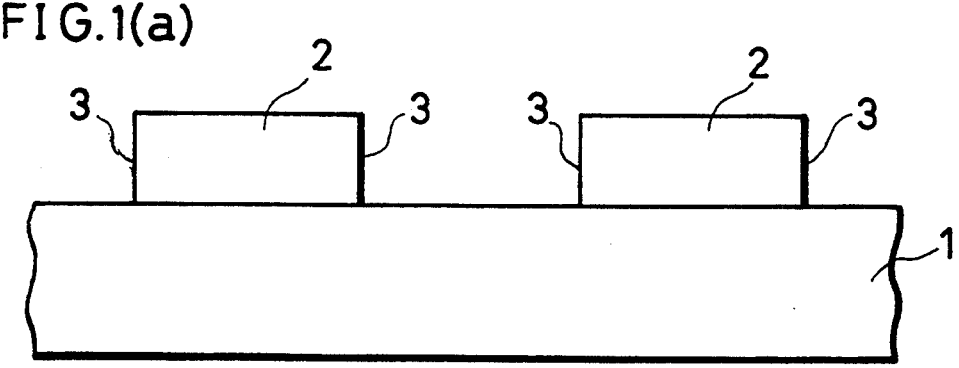
FIG. 1a, b, c, d is an explanatory diagram showing the main steps in a manufacturing method of a master plate of an optical memory device in accordance with the present invention.
Figure 1B:
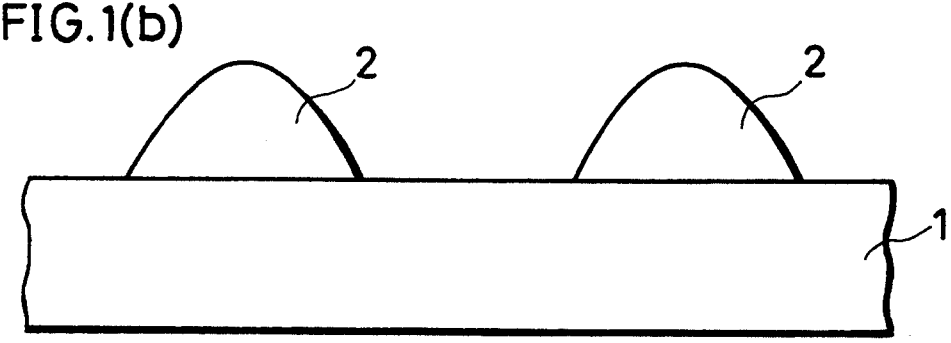
Figure 1C:
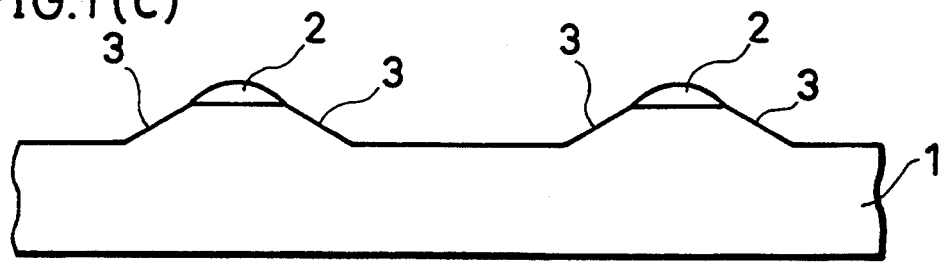
Figure 1D:
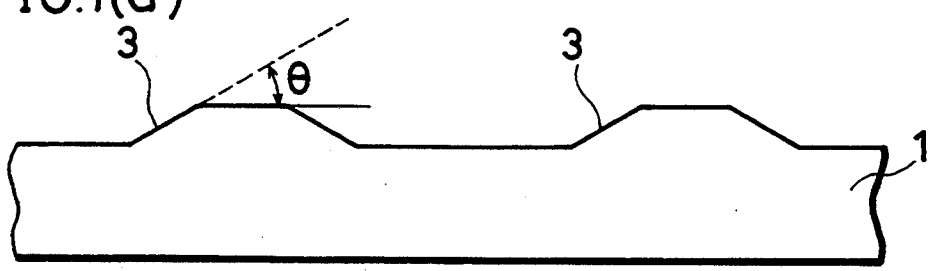
Figure 2:
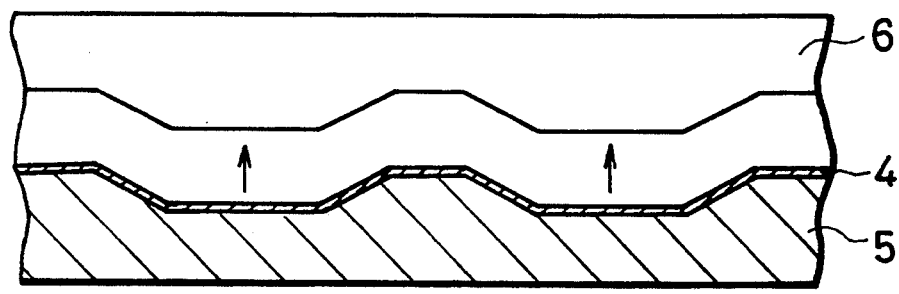
FIG. 2 is an explanatory diagram showing the condition where the copying is carried out with respect to a polycarbonate substrate according to the injection molding process wherein the stamper, which is manufactured based on the above-mentioned master plate, is used, and thereafter the mold release of the polycarbonate substrate is carried out.
Figure 3A:
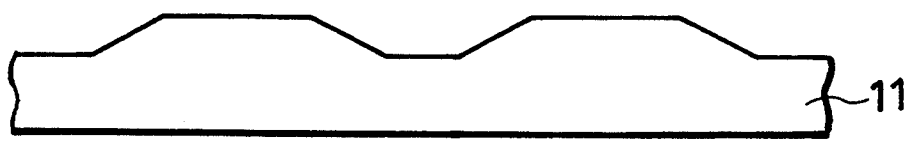
FIG. 3a, b, c, d is an explanatory diagram showing the difference between a conventional etched master plate and a conventional photo resisted master plate.
Figure 3B:
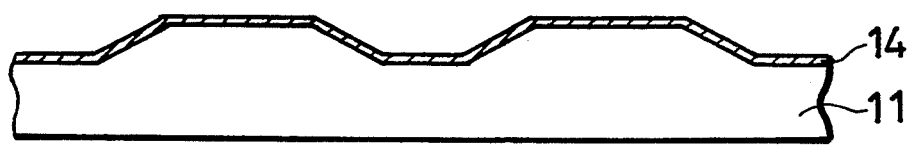
Figure 3C:
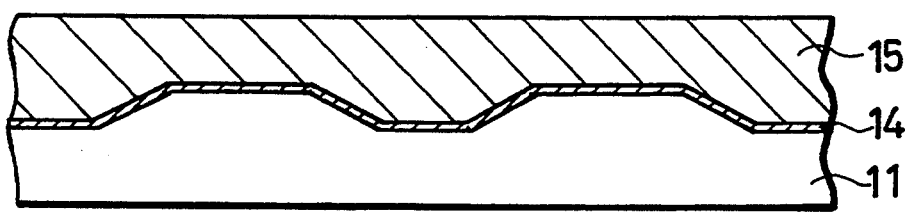
Figure 3D:
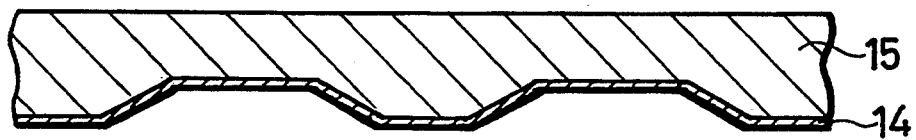
Figure 4A:
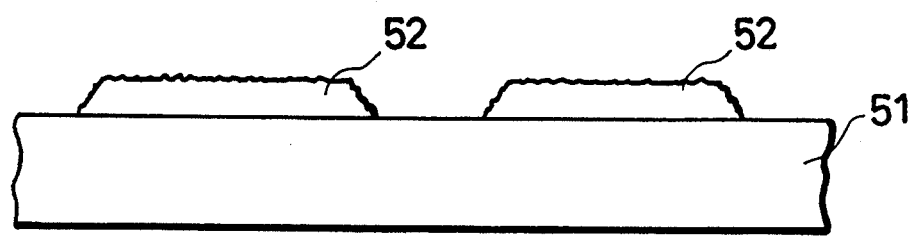
FIG. 4a, b is an explanatory diagram showing the step wherein the stamper is produced from the etched master plate according to the conventional manufacturing method.
Figure 4B:
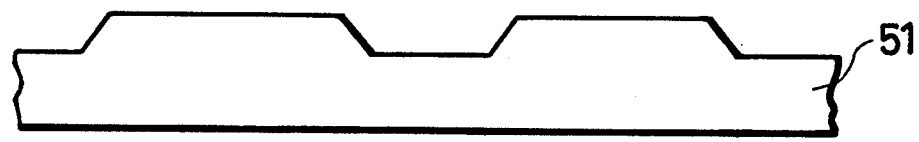
Figure 5A:
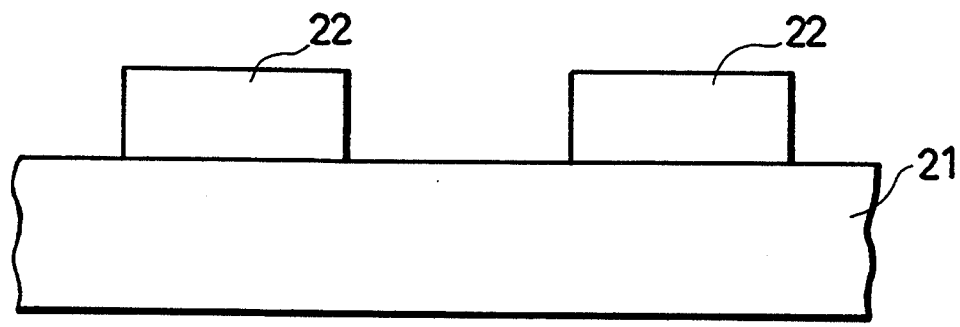
FIG. 5a, b, c is an explanatory diagram showing one example of the conventional manufacturing methods of the optical memory device.
Figure 5B:
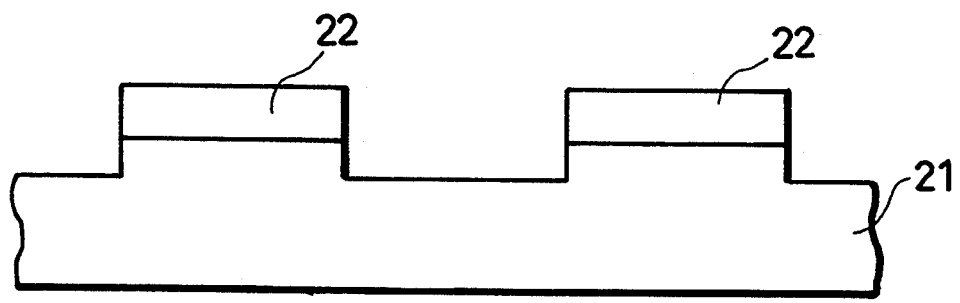
Figure 5C:
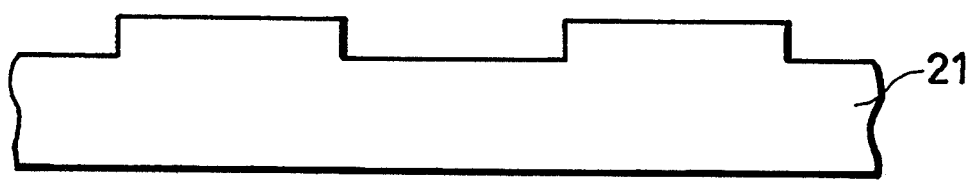
Figure 6A:
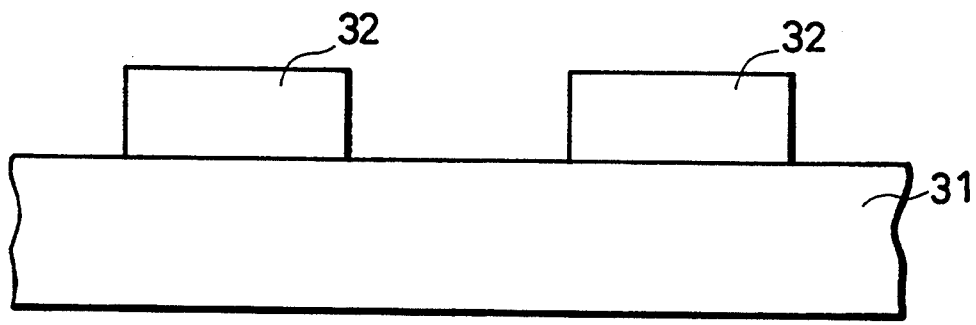
FIG. 6a, b, c, d is an explanatory diagram showing another example of the conventional manufacturing methods of the optical memory device.
Figure 6B:
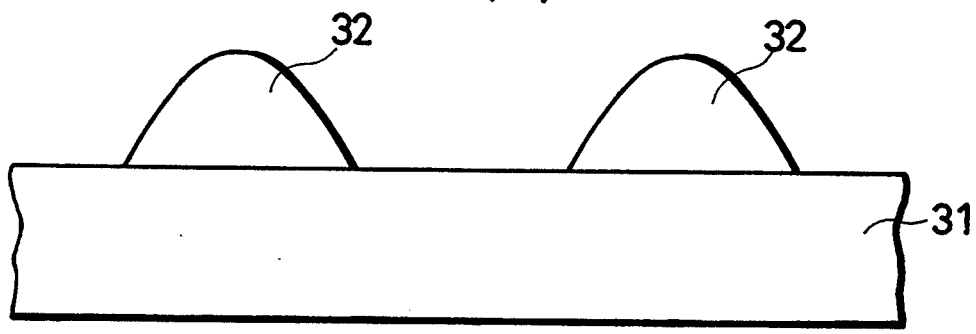
Figure 6C:
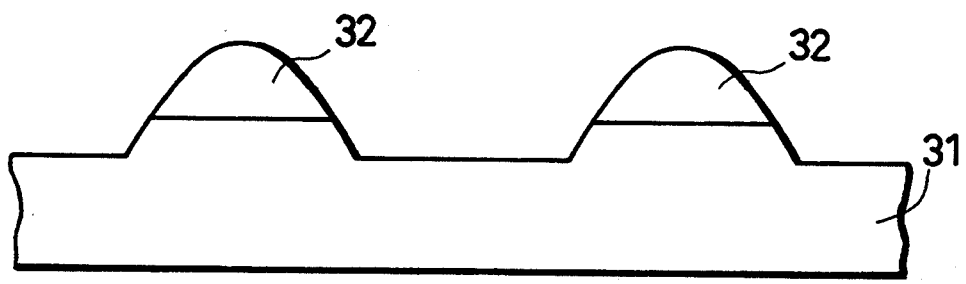
Figure 6D:
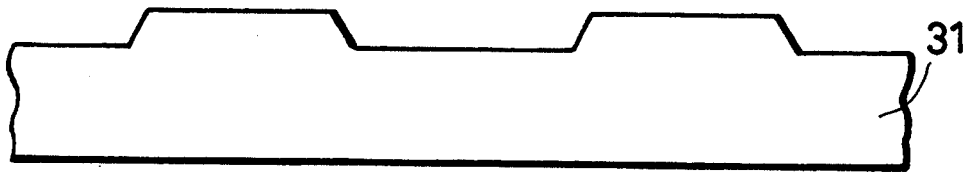

The following description deals with one preferred embodiment of the present invention with reference to FIGS. 1 and 2.

The following deals with a manufacturing method of the optical memory device in accordance with the present embodiment with reference to FIG. 1. More specifically, a substrate 1 is first coated with a photo resist having a thickness of the range between 200 nm and 400 nm. The photo resist is of a positive type such as AZ-1400 (trade name) which is produced by "SHIPLEY CO. INC.". The coating is made according to a method such as the spin coating method. The substrate 1 is made of glass or quartz. After the formation of the photo resist thin film, the photo resist thin film is exposed, by the laser cutting method or the contact printing method, so as to have patterns such as guiding grooves, and thereafter is developed. FIG. 1(a) shows photo resist patterns 2 to which the development has been made. The developed photo resist pattern 2, as shown in FIG. 1(a), are defined such that respective edge portions 3 of the photo resist patterns 2 rise upward substantially perpendicularly with respect to the surface of the substrate 1.

In that case, the photo resist patterns 2 are disposed spirally or concentrically such that the pitch between the photo resist patterns 2 is 1.6 μm. In case where information is recorded on respective bottom portions of the guiding grooves, the respective photo resist patterns 2 are formed such that each width is substantially 0.6 μm. On the other hand, in case where information is recorded on respective land portions of the guiding grooves, the respective photo resist patterns 2 are formed such that each width is substantially 1.0 μm.

Next, post-baking is carried out with respect to the developed photo resist patterns 2 at about 150 ° C. for 30 minutes. In that case, the post-baked photo resist patterns become softened to be fluidized. Thus, the post-baked photo resist patterns 2 change their shapes like FIG. 1(b) due to the surface tension exerted on the substrate 1. Note that the temperature of the post-baking is preferably a temperature of not less than that at which the photo resist patterns soften.

Then, the reactive ion etching (hereinbelow referred to as dry etching) is carried out for five minutes under the conditions where the etching gas pressure of 10 mm Torr is introduced and the high frequency output power of 400 Watt is applied. Note that $CF_4$ gas is used during the dry etching process as the etching gas to be introduced and this $CF_4$ gas contains a predetermined amount of $O_2$ gas. According to the present embodiment, the flow rate of $CF_4$ gas of is about 10 (SCCM) and the flow rate of $O_2$ gas falls in the range between 4 (SCCM) and 10 (SCCM). FIG. 1(c) shows the condition after the dry etching process. Respective edge portions of the guiding grooves are greatly inclined with respect to the surface of the substrate 1 according to FIG. 1(c). Note that the depths of the guiding grooves fall in the range between 50 nm and 80 nm. Note also that $CHF_3$ gas is preferably used as the etching gas.

More specifically, each edge portion 3 is greatly inclined with respect to the surface of the substrate 1 based on the fact that (1) before the dry etching process is carried out (see FIG. 1(b)), the photo resist patterns 2 have already been inclined with respect to the surface of the substrate 1 due to the softening of the photo resist patterns 2, and (2) isotropic etching is carried out with respect to the photo resist patterns 2 because a predetermined amount of $O_2$ gas is mixed during the dry etching process.

At the final step, the residual photo resist is removed. Thus, as shown in FIG. 1(d), an etching master plate is obtained wherein inclined angle θ of the edge portions 3 with respect to the surface of the substrate 1 falls in the range between 23° and 27°. The inclined angle θ is hereinbelow referred to as an edge angle θ.

A stamper of FIG. 2 is provided according to the etched master plate manufactured by the above-mentioned manner. The stamper is manufactured according to the following steps. More specifically, the etched master plate is first prepared and is coated with an electrode member 4 such as Ni, the electrode member 4 being a thin film having a thickness of the range between 20 nm to 100 nm. A Ni electrocasted thin film 5, having a thickness of the range between 200 μm and 400 μm, is formed on the electrode member 4. The Ni electrocasted thin film 5 is removed from the master plate and the other surface of the Ni electrocasted thin film 5 is polished, thereby manufacturing the stamper.

The following deals with tile comparison between the edge angle of the stamper in accordance with the present embodiment and that in accordance with the earlier mentioned conventional methods (1) to (3) with reference to Table 1.

As is clear from Table 1, the respective stampers which are manufactured by the master plates based on the conventional methods (1) through (3) have their great edge angles θ, i.e., 49° to 83°. Accordingly, the edge portions of the polycarbonate substrate are caught by the injection molded polycarbonate substrate when the mold release of the stamper from the injection molded polycarbonate substrate is carried out, thereby deforming the corresponding portions of the polycarbonate substrate.

Note that according to the conventional methods of Table 1, edge angle $\theta$ is greater in the case where $O_2$ gas is not mixed than in the case where $O_2$ gas is mixed during the dry etching process. Further, as is clear from Table 1, even when the master plates are made based on the same conventional method (3), the more amount of $O_2$ gas is mixed, the smaller the respective edge angles $\theta$ of the provided stampers are.

Figure 8:
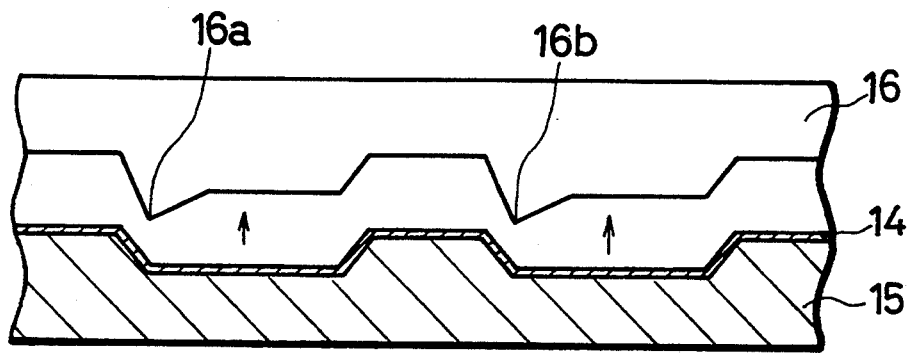
FIG. 8 is an explanatory diagram showing the condition where the copying is carried out with respect to a polycarbonate substrate according to the injection molding process wherein the stamper, which is manufactured based on the conventional master plate, is used, and thereafter the mold release of the polycarbonate substrate is carried out.

According to the comparative example of Table 1, the flow rate of $O_2$ gas is set to be 2 (SCCM), but the temperature of the post-baking and the flow rate of $CF_4$ gas are the same as those of the present embodiment. Even the comparative example, edge angle $\theta$ is 42°. Therefore, the edge portions of the polycarbonate substrate are caught by the stamper when the mold release of the injection molded polycarbonate substrate from the stamper is carried out, thereby deforming the corresponding portions of the polycarbonate substrate (see reference numerals 16a and 16b of FIG. 8).

In contrast, the stampers manufactured by the master plate based on the method of the present embodiment have edge angle $\theta$ which is less than 30°, i.e., 23° to 27°, the stampers being manufactured under the conditions where the temperature of the post-baking process is set to be about 150° C. and the flow rate of $O_2$ gas is set to be at least 4 (SCCM). Accordingly, no edge portion of the polycarbonate substrate 6 is caught (see FIG. 2) by the stamper when the mold release of the injection molded polycarbonate substrate from the stamper, which is composed of the electrode member 4 and the Ni electrocasted thin film 5, is carried out in the direction of the arrow of FIG. 2. Thus, the respective shapes of the guiding grooves of the stamper can be kept unchanged, thereby enabling to obtain the substrates for use in the optical memory device with repeatability.

As mentioned above, according to Table 1, the required flow rate of $O_2$ gas to be mixed during the dry etching process is at least 4 (SCCM) and the required temperature of the post-baking process is about 150° C. The resisted thin film softens so as to be fluidized since tile temperature of the post-baking process is set to be 150° C., thereby making the side portions of the post-baked resist thin film be inclined with respect to the substrate surface. In the process of the formation of tile guiding grooves on the substrate surface during the dry etching process, the etching of the resist thin film having a shape like above is simultaneously carried out, thereby making the respective edge portions of the guiding grooves greatly be inclined with respect to the substrate surface. Thus, the master plate of the optical memory device having the inclined angle of not more than 30° can be manufactured.

The master plate of the optical memory device in accordance with the present invention, as mentioned above, is arranged such that the respective edge portions of the guiding grooves are greatly inclined with respect to the substrate surface and the inclined angles with respect to the substrate surface can fall within 30°.

therefore, even when the copying is carried out with respect to the substrate of the optical memory device according to the injection molding process wherein the stamper, which is manufactured based on the master plate of the optical memory device in accordance with the present invention, is used, the mold release of the stamper can be carried out without being caught by the substrate. Thus, it is possible to keep the respective shapes of the guiding grooves of the stamper, thereby enabling of manufacturing the substrate of the optical memory device with high repeatability.

The manufacturing method of the master plate of the optical memory comprises the following steps: (1) coating a substrate with photo resist thin film; (2) exposing guiding groove patterns of the master plate of the optical memory device by projecting light onto the photo resist thin film; (3) developing the resist thin film having the exposed guiding groove patterns; (4) post-baking the developed resist thin film at the temperature which causes the resist thin film to be deformed; (5) carrying out dry etching after the post-baking by the use of mixed gas including an etching gas for the substrate and an etching gas for the resist thin film; and (6) removing the resist thin film after the dry etching process.

Therefore, the side portions of the resist thin film are inclined due to the deformation thereof during the post-baking process. The respective edge portions of the guiding grooves are greatly inclined with respect to the substrate surface during the dry etching process since the isotropic etching is carried out with respect to the photo resist thin film having the above-mentioned shape. Accordingly, the master plate of the optical memory device having the inclined angle which is not more than 30° can be manufactured.

Moreover, even when the copying is carried out with respect to the substrate of the optical memory device according to the injection molding process wherein the stamper, which is manufactured based on the master plate of the optical memory device in accordance with the present invention, is used, the mold release of the stamper can be carried out without being caught by the substrate. Thus, it is possible to keep the respective shapes of the guiding grooves of the stamper, thereby enabling of manufacturing the substrate of the optical memory device with high repeatability.

There are described above novel features which the skilled man will appreciate give rise to advantages. These are each independent aspects of the invention to be covered by the present application, irrespective of whether or not they are included within the scope of the following claims.

TABLE 1

| POST BAKE TEMP. (°C.) | $CF_4$ FLOW (SCCM) | $O_2$ FLOW (SCCM) | EMPLOYED METHOD | $\theta$ (°) | EDGE IS CAUGHT? |
|---|---|---|---|---|---|
| 100 | 10 | 0 | METHOD (1) | 83 | YES |
|  | 10 | 2 | METHOD (3) | 74 | YES |
|  | 10 | 4 | METHOD (3) | 70 | YES |
|  | 10 | 6 | METHOD (3) | 67 | YES |
|  | 10 | 8 | METHOD (3) | 64 | YES |
|  | 10 | 10 | METHOD (3) | 62 | YES |
| 150 | 10 | 0 | METHOD (2) | 49 | YES |
|  | 10 | 2 | COMPARATIVE EXAMPLE | 42 | A LITTLE BIT |
|  | 10 | 4 | PRESENT EMBODIMENT | 27 | NO |
|  | 10 | 6 | PRESENT EMBODIMENT | 26 | NO |
|  | 10 | 8 | PRESENT EMBODIMENT | 24 | NO |

TABLE 1-continued

| POST BAKE TEMP. (°C.) | CF4 FLOW (SCCM) | O2 FLOW (SCCM) | EMPLOYED METHOD | θ (°) | EDGE IS CAUGHT? |
|---|---|---|---|---|---|
| | 10 | 10 | PRESENT EMBODIMENT | 23 | NO |

Note that methods (1) to (3) of Table 1 correspond to conventional methods respectively and $\theta$ indicates an edge angle.

What is claimed is:

1. A master plate, for manufacturing a stamper for injection molding of an optical memory device comprising:

a substrate member having a plurality of guiding grooves on a surface thereof, the guiding grooves being spaced at a predetermined interval, each guiding groove having edge portions, wherein said edge portions are inclined with respect to the surface of said substrate member, and inclined angles of said edge portions with respect to the surface of said substrate member are not more than 30°.

2. The master plater as set forth in claim 1, wherein said stamper member includes a Ni electrocasted thin film to which guiding groove patterns of said substrate surface are copied.

3. The master plate as set forth in claim 1, wherein the inclined angles of said edge portions with respect to the surface of said substrate member fall in a range between 23° and 27°.

4. The master plate as set forth in claim 1, wherein said substrate member is of glass.

5. The master plate as set forth in claim 1, wherein said substrate member is of quartz.

6. The master plate as set forth in claim 1, wherein said guiding grooves are disposed spirally or concentrically.

7. The master plate as set forth in claim 1, wherein said guiding grooves have depths of a range between 50 nm and 80 nm.

8. A manufacturing method of a master plate used for manufacturing a stamper for injection molding of an optical memory device comprising the steps of:

(a) coating a substrate member with a photo-resist thin film;

(b) exposing guiding groove patterns of the master plate of the optical memory device by projecting light onto the photo-resist thin film;

(c) developing the photo-resist thin film having the exposed guiding groove patterns;

(d) post-baking the developed photo-resist thin film having the exposed guiding groove patterns;

(e) carrying out dry etching after the post-baking by use of a mixed gas including a first etching gas for the substrate and a second etching gas for the photo-resist thin film; and (f) removing the photo-resist thin film after the dry etching process.

9. The manufacturing method as set forth in claim 8, herein the photo-resist thin film formed such that the substrate member is coated with a positive type photo resist having a thickness of 200 nm to 400 nm according to spin coating method.

10. The manufacturing method as set forth in claim 8, herein said step (d) comprises the step of inclining side portions of the photo-resist thin film with respect to the surface of the substrate member, said step (e) comprises the steps of:

(f) forming the guiding grooves on the surface of the substrate member; and (g) simultaneously etching the resist thin film in said step (f), whereby the guiding grooves are formed such that each edge portion is inclined with respect to the substrate member at an angle of not more than 30°.

11. The manufacturing method as set forth in claim 10, wherein the post-baking of said step (d) is carried out at a temperature of about 150° C. for 30 minutes.

12. The manufacturing method as set forth in claim 10, here in the dry etching of said step (e) is carried out according to reactive ion etching.

13. The manufacturing method as set forth in claim 12, wherein the reactive ion etching is carried out under the conditions where a flow rate of CF4 gas is about 10 (SCCM), a flow rate of O2 gas falls in a range between 4 (SCCM) and (SCCM), an etching gas pressure is about 10 mm Torr, and applied high frequency output power is about 400 Watt.

14. The manufacturing method as set forth in claim 12, wherein the first etching gas of said step (e) is selected from the group consisting of CF4, gas and CHF3 gas, and the second etching gas of said step (e) is O2 gas.

15. The manufacturing method as set forth in claim 14, wherein the mixed gas of said step (e) includes CF4 and O2 gases, and mixing ratios of CF4 and O2 gases fall in a range between 1:0.4 and 1:1.

* * * * *

UNITED STATES PATENT AND TRADEMARK OFFICE
CERTIFICATE OF CORRECTION

PATENT NO. : 5,347,510
DATED : September 13, 1994
INVENTOR(S) : Hirokane, et al.

It is certified that error appears in the above-indentified patent and that said Letters Patent is hereby corrected as shown below:

column 6, line 16, change "10 mmTorr" to --10 mTorr-- and
claim 13, line 6, change "10 mm Torr" to --10 mTorr--.

Signed and Sealed this

Fifth Day of August, 1997

Attest:

Attesting Officer

BRUCE LEHMAN

Commissioner of Patents and Trademarks